(12) United States Patent
Son et al.

(10) Patent No.: US 12,176,145 B2
(45) Date of Patent: Dec. 24, 2024

(54) LENS DRIVING DEVICE CAPABLE OF REDUCING ELECTROMAGNETIC INTERFERENCE AND IMPROVING ELECTROMAGNETIC FORCE

(71) Applicant: LG INNOTEK CO., LTD., Seoul (KR)

(72) Inventors: Byung Wook Son, Seoul (KR); Young Ho Kim, Seoul (KR); Hyun Joong Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 629 days.

(21) Appl. No.: 17/430,212

(22) PCT Filed: Mar. 11, 2020

(86) PCT No.: PCT/KR2020/003400
§ 371 (c)(1),
(2) Date: Aug. 11, 2021

(87) PCT Pub. No.: WO2020/184986
PCT Pub. Date: Sep. 17, 2020

(65) Prior Publication Data
US 2022/0165467 A1 May 26, 2022

(30) Foreign Application Priority Data
Mar. 13, 2019 (KR) ........................ 10-2019-0028663

(51) Int. Cl.
*G02B 27/64* (2006.01)
*G03B 5/00* (2021.01)
(Continued)

(52) U.S. Cl.
CPC ........... *H01F 7/081* (2013.01); *G02B 27/646* (2013.01); *G03B 5/00* (2013.01); *G03B 13/36* (2013.01);
(Continued)

(58) Field of Classification Search
CPC ....... G02B 27/646; G02B 27/64; H01F 7/081; H04N 23/55; H04N 23/67; H04N 23/687;
(Continued)

(56) References Cited

U.S. PATENT DOCUMENTS

| 2014/0009631 A1 | 1/2014 | Topliss |
| 2018/0224624 A1 | 8/2018 | Ichihashi |

(Continued)

FOREIGN PATENT DOCUMENTS

| CN | 109073857 A | 12/2018 |
| JP | 2018-128589 A | 8/2018 |

(Continued)

*Primary Examiner* — Arnel C Lavarias
(74) *Attorney, Agent, or Firm* — Birch, Stewart, Kolasch & Birch, LLP

(57) ABSTRACT

A lens driving device includes a housing; a bobbin disposed in the housing; a coil disposed on the bobbin; and a first magnet disposed opposite to the coil in the housing. The first magnet includes an inner surface facing the coil, and an outer surface disposed at the opposite side to the inner surface. The first magnet includes a first region provided between the inner surface and the outer surface and having a first thickness, and a second region extending from the first region and having a second thickness which is smaller than the first thickness.

15 Claims, 9 Drawing Sheets

(51) Int. Cl.
  *G03B 13/36* (2021.01)
  *H01F 7/08* (2006.01)
  *H04N 23/55* (2023.01)
  *H04N 23/54* (2023.01)
  *H04N 23/67* (2023.01)
  *H04N 23/68* (2023.01)

(52) U.S. Cl.
  CPC ..... *H04N 23/55* (2023.01); *G03B 2205/0007* (2013.01); *G03B 2205/0069* (2013.01); *H04N 23/54* (2023.01); *H04N 23/67* (2023.01); *H04N 23/687* (2023.01)

(58) Field of Classification Search
  CPC ............... H04N 23/54; H04N 5/23248; H04N 5/23264; H04N 5/2328; H04N 5/23287; H04N 5/2257; G03B 5/00; G03B 13/36; G03B 2205/0007; G03B 2205/0069; G03B 5/06; G03B 2217/005; G03B 2205/00
  USPC ......... 359/557, 554; 250/201.1, 201.2, 201.4
  See application file for complete search history.

(56) References Cited

U.S. PATENT DOCUMENTS

| | | |
|---|---|---|
| 2019/0377241 A1 | 12/2019 | Lee et al. |
| 2020/0012070 A1* | 1/2020 | Wang ................... H02K 11/215 |
| 2020/0166771 A1* | 5/2020 | Huang ................. G02B 27/646 |

FOREIGN PATENT DOCUMENTS

| | | |
|---|---|---|
| KR | 10-2011-0010016 A | 1/2011 |
| KR | 10-2016-0128651 A | 11/2016 |
| KR | 10-2018-0013286 A | 2/2018 |
| KR | 10-2018-0092720 A | 8/2018 |
| KR | 10-2018-0097228 A | 8/2018 |
| WO | 2018/147897 A1 | 8/2018 |

\* cited by examiner

LENS DRIVING DEVICE CAPABLE OF REDUCING ELECTROMAGNETIC INTERFERENCE AND IMPROVING ELECTROMAGNETIC FORCE

CROSS REFERENCE TO RELATED APPLICATIONS

This application is the National Phase of PCT International Application No. PCT/KR2020/003400, filed on Mar. 11, 2020, which claims priority under 35 U.S.C. 119 (a) to Patent Application No. 10-2019-0028663, filed in the Republic of Korea on Mar. 13, 2019, all of which are hereby expressly incorporated by reference into the present application.

TECHNICAL FIELD

The present invention relates to a lens driving device and a camera module.

BACKGROUND ART

The camera module may comprise an image sensor and a printed circuit board on which an image sensor that transmits electrical signals is mounted, an infrared cut filter that blocks light in an infrared region to the image sensor, and an optical system composed of at least one or more lenses that transmit an image to the image sensor. At this time, a lens driving device capable of performing an auto-focusing function and a hand shake correction function may be installed in the optical system.

The lens driving device can be configured in various ways, and voice coil motors are generally used. The voice coil motor may perform an auto-focusing function by operating by electromagnetic interaction of a coil wound on an outer circumferential surface of a bobbin in which a driving magnet fixed to a housing and a lens barrel are coupled. In such a voice coil motor type actuator module, a bobbin that moves up and down is elastically supported by the lower and upper elastic members, so that the bobbin may reciprocate in a direction parallel to the optical axis.

Recently, in order to shorten the auto-focusing and hand shake correction time of a camera module, a lens driving device has been developed that receives feedback on position information of a bobbin in which a lens is installed, and quickly identifies an optimal focusing position.

Meanwhile, in a lens driving device that quickly determines an optimal focusing position, a sensor magnet and a sensor for detecting the position of the sensor magnet are required, and electromagnetic interference with the driving magnet is a problem.

DETAILED DESCRIPTION OF THE INVENTION

Technical Subject

The problem to be solved by the present invention is to provide a lens driving device and a camera module capable of reducing electromagnetic interference and improving electromagnetic force.

Technical Solution

A lens driving device according to an embodiment of the present invention comprises: a housing; a bobbin disposed in the housing; a coil disposed on the bobbin; and a first magnet disposed in the housing and facing the coil, wherein the first magnet comprises an inner surface facing the coil, and an outer surface disposed at the opposite side of the inner surface, and wherein the first magnet may comprise a first region provided between the inner surface and the outer surface and having a first thickness, and a second region being extended from the first region and having a second thickness which is smaller than the first thickness.

The housing may comprise a first portion disposed between the coil and the second region of the first magnet in a direction perpendicular to the optical axis.

The second region of the first magnet is disposed in contact with the first portion of the housing, and the sum of the second thickness of the second region of the first magnet and the thickness of the first portion of the housing may be the same as the first thickness of the first region of the first magnet.

The second region of the first magnet may be extended from one end of the first region, and the first magnet may comprise a third region bent and extended from the other end of the first region.

The housing comprises first to fourth lateral surfaces and first to fourth surfaces formed between the first to fourth lateral surfaces, and the first and second regions of the first magnet are disposed on the first lateral surface, and the third region may be disposed on the fourth surface.

The length of an inner surface of the first region in the horizontal direction may be longer than the length of an inner surface of the second region in the horizontal direction.

The first magnet may comprise two first magnets, and the two first magnets may be symmetrical to each other with respect to an optical axis.

The housing comprises a second portion, and the third region of the first magnet may be disposed between the second portion of the housing and the bobbin in a direction perpendicular to an optical axis.

An elastic member connecting the bobbin and the housing is comprised; the housing comprises a groove formed on an upper surface; the elastic member comprises a body, a hole formed in the body, an extension portion disposed in the hole, and a connection portion connecting the extension portion and the body; the extension portion is overlapped with the groove of the housing in the optical axis direction; and an adhesive bonding the extension portion of the elastic member to the housing may be disposed in the groove of the housing.

The lens driving device according to the present embodiment comprises a housing; a bobbin disposed in the housing; a coil disposed on the bobbin; and a first magnet disposed in the housing and facing the coil, wherein the housing comprises an inner surface facing the bobbin and an outer surface disposed opposite the inner surface, wherein the housing comprises a first portion being extended from the inner surface and a second portion being extended from the outer surface, and wherein the first magnet may comprise a first region not being overlapped with the housing in a first direction perpendicular to the optical axis, a second region being extended from one end of the first region and being overlapped with the first portion of the housing in the first direction, and a third region being extended from the other end of the first region and being overlapped with the second portion of the housing in the first direction.

A lens driving device according to an aspect of the present invention for achieving the above object comprises: a housing; a bobbin disposed in the housing; a coil disposed on the bobbin; and a first magnet disposed in the housing and facing the coil, wherein the first magnet may have a first width and a second width smaller than the first width.

In addition, the first magnet may comprise a first region having the first width, a second region having the second width and being extended from one end of the first region, and a third region bent at the other end of the first region.

In addition, the housing comprises first to fourth lateral surfaces and first to fourth surfaces formed between the first to fourth lateral surfaces; the first and second regions of the first magnet are disposed on the first lateral surface; and the third region may be disposed on the fourth surface.

In addition, the second region of the first magnet may be overlapped with the first and second surfaces in a direction perpendicular to the optical axis.

Also, the length of the first region may be longer than the length of the second region.

In addition, the first magnet may comprise two first magnets, and the two first magnets may be symmetrical to each other with respect to the optical axis.

A camera module according to an aspect of the present invention for achieving the above object comprises: a housing; a bobbin disposed in the housing; a coil disposed on the bobbin; and a first magnet disposed in the housing and facing the coil, wherein the first magnet may have a first width and a second width smaller than the first width.

In addition, it may comprise a second magnet disposed on the bobbin; and a sensor detecting the position of the second magnet.

In addition, the housing comprises first to fourth lateral surfaces; the bobbin comprises fifth to eighth lateral surfaces opposite to the first to fourth lateral surfaces of the housing; the first magnet comprises two first magnets; the second magnet comprises two second magnets; the two first magnets are disposed on the first and third lateral surfaces of the housing; and the two second magnets may be disposed on the sixth and eighth lateral surfaces of the bobbin.

In addition, the two first magnets may be symmetrical to each other with respect to an optical axis, and the two second magnets may be symmetrical to each other with respect to the optical axis.

In addition, the two second magnets may be overlapped with the two first magnets in a direction perpendicular to the optical axis, respectively.

In addition, it may comprise a dummy magnet disposed on the bobbin.

In addition, the housing comprises first to fourth lateral surfaces; the bobbin comprises fifth to eighth lateral surfaces opposite to the first to fourth lateral surfaces of the housing; the first magnet comprises two first magnets; the two first magnets are disposed on the first and third lateral surfaces of the housing; and one of the second magnet and the dummy magnet may be disposed on the sixth lateral surface, and the other may be disposed on the eighth lateral surface.

In addition, the two first magnets may be symmetrical to each other with respect to an optical axis, and the second magnet and the dummy magnet may be symmetrical to each other with respect to the optical axis.

In addition, the second magnet and the dummy magnet may be overlapped with the two first magnets in a direction perpendicular to the optical axis, respectively.

In addition, the first magnet may comprise: a first region having the first width; a second region having the second width and being extended from one end of the first region; and a third region bent at the other end of the first region.

Also, the length of the first region may be longer than the length of the second region.

In addition, the housing comprises first to fourth lateral surfaces and first to fourth surfaces formed between the first to fourth lateral surfaces, wherein the first and second regions of the first magnet are disposed on the first lateral surface, and the third region may be disposed on the fourth surface.

In addition, it may comprise an elastic member connected to the housing and the bobbin.

In addition, the housing comprises a groove formed on an upper surface; the elastic member comprises a body, a hole formed in the body, an extension portion disposed in the hole, and a connection portion connecting the extension portion and the body; and the extension portion may be overlapped with the groove in an optical axis direction.

In addition, the hole may be formed in the shape of a letter "C".

In addition, the elastic member may comprise an inner elastic portion connected to the bobbin, an outer elastic portion connected to the housing, and a connection elastic portion connecting the inner elastic portion and the outer elastic portion.

In addition, the housing comprises a groove formed on the upper surface, wherein the inner elastic portion comprises: a body; a hole formed in the body; an extension portion disposed in the hole; and a connection portion connecting the extension portion and the body, and wherein the extension portion may be overlapped with the groove in an optical axis direction.

Advantageous Effects

Through this embodiment, it is possible to provide a lens driving device and a camera module capable of reducing electromagnetic interference and enhancing electromagnetic force.

BEST MODE

Figure 1:
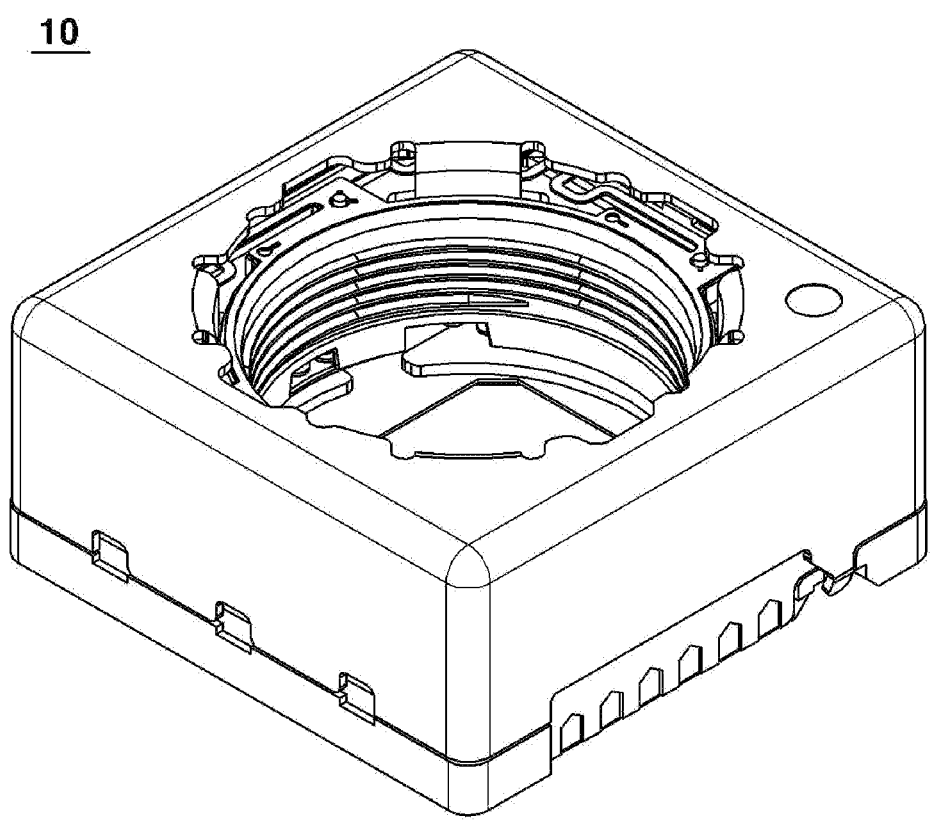
FIG. 1 is a perspective view of a camera module according to an embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In addition, terms used in the present specification are for describing embodiments and are not intended to limit the present invention.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

The 'optical axis direction' used below is defined as the optical axis direction of a lens and/or image sensor coupled to the lens driving device. Meanwhile, the 'optical axis direction' may correspond to an 'up-down direction', a 'z-axis direction', and the like.

The "auto focus function" used below is defined as the function that automatically focuses on a subject by moving the lens in the direction of the optical axis according to the distance of the subject so that clear images of the subject can be obtained on the image sensor. Meanwhile, the 'auto focus' can be used interchangeably with 'Auto Focus (AF)'.

The 'hand shake correction function' used below is defined as a function of moving or tilting a lens in a direction perpendicular to the optical axis direction so as to cancel a vibration (movement) generated in an image sensor by an external force. Meanwhile, the "hand shake correction" may be used interchangeably with "optical image stabilization (OIS)".

The optical apparatus may be any one of a hand phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus is not limited thereto, and any device for photographing an image or a picture may be comprised in the optical apparatus.

The optical apparatus may comprise a main body. The main body can form the appearance of an optical apparatus. The main body may accommodate the camera module 10. A display unit may be disposed on one surface of the main body. For example, the display unit and the camera module 10 may be disposed on one surface of the main body, and the camera module 10 may be additionally disposed on the other surface of the main body (a surface located on the opposite side of the main body).

The optical apparatus may comprise a display unit. The display unit may be disposed on one surface of the main body. The display unit may output an image photographed by the camera module 10.

The optical apparatus may comprise a camera module 10. The camera module 10 may be disposed on the main body. At least a portion of the camera module 10 may be accommodated inside the main body. The camera module 10 may be provided in plural. The camera module 10 may be disposed on one side of the main body and the other side of the main body, respectively. The camera module 10 may take an image of a subject.

Hereinafter, a camera module according to the present embodiment will be described in more detail with reference to the accompanying drawings.

Figure 2:
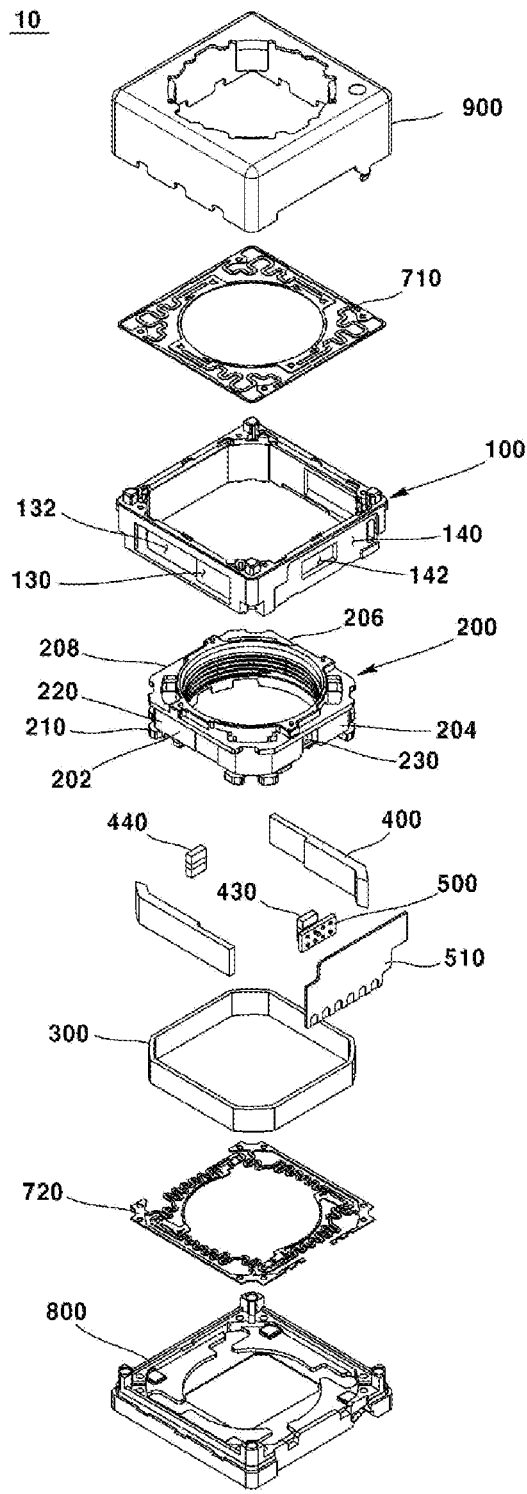
FIG. 2 is an exploded perspective view of a camera module according to an embodiment of the present invention.
Figure 3:
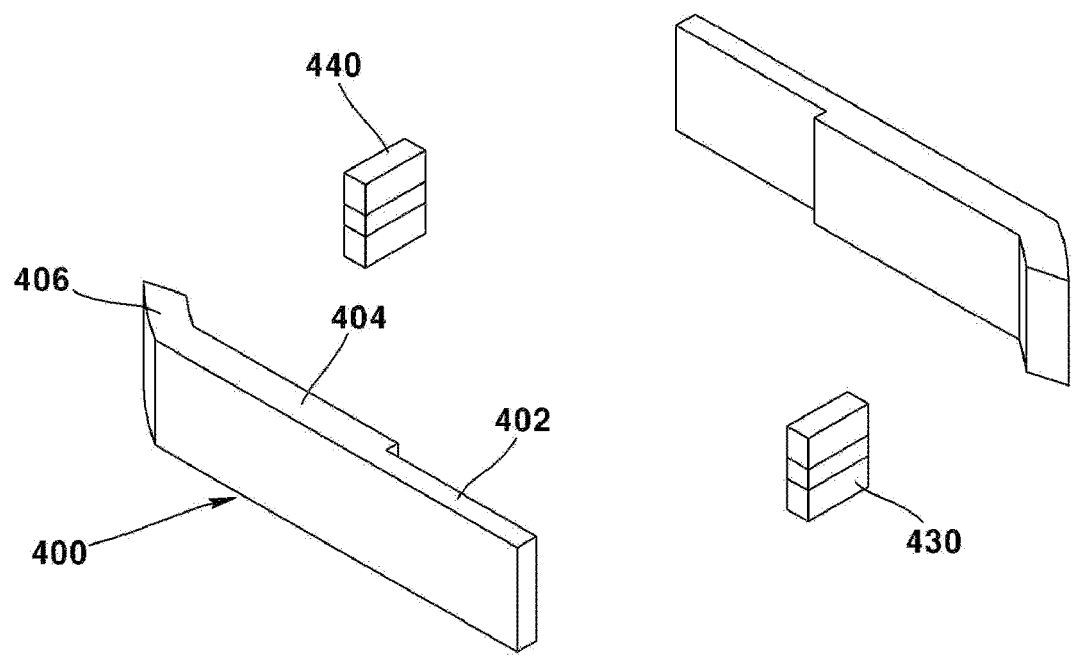
FIG. 3 is a perspective view of a partial configuration of a camera module according to an embodiment of the present invention.
Figure 4:
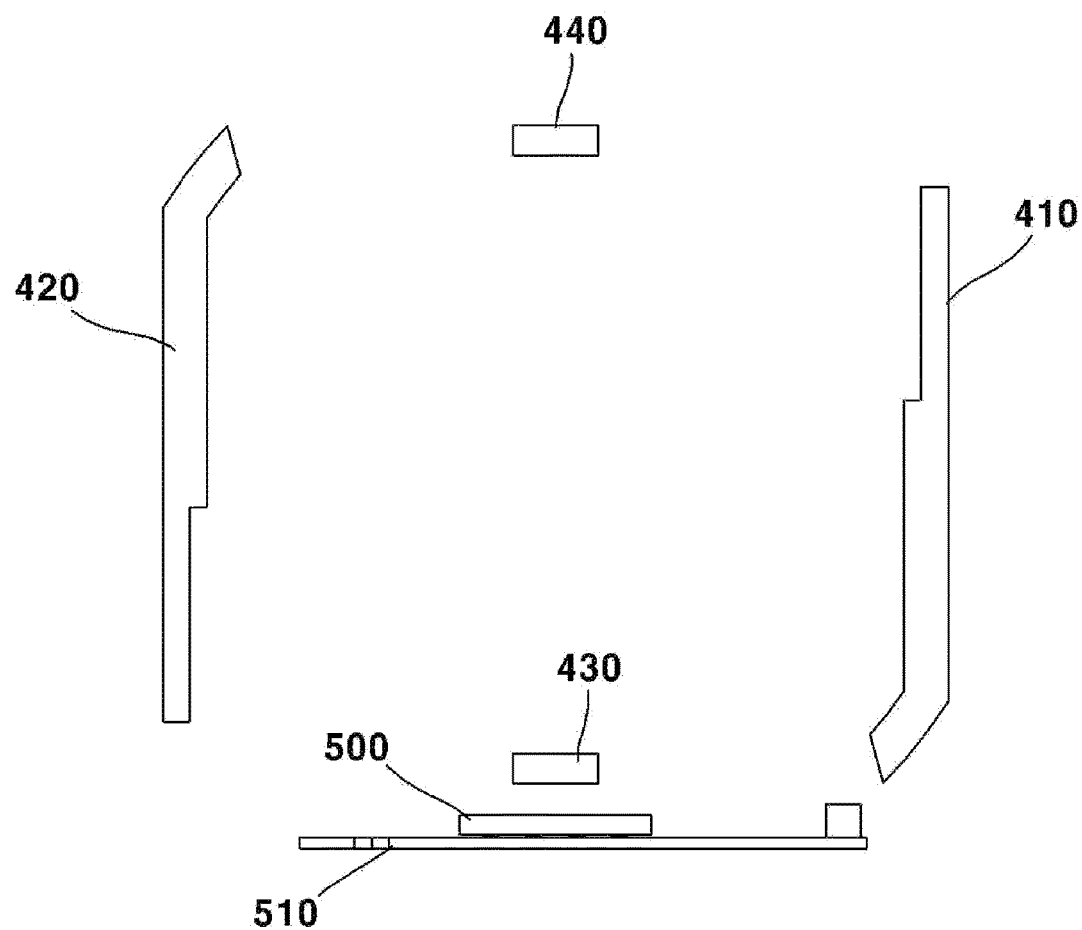
FIGS. 4 and 5 are plan views of partial configurations of a camera module according to an embodiment of the present invention.
Figure 5:
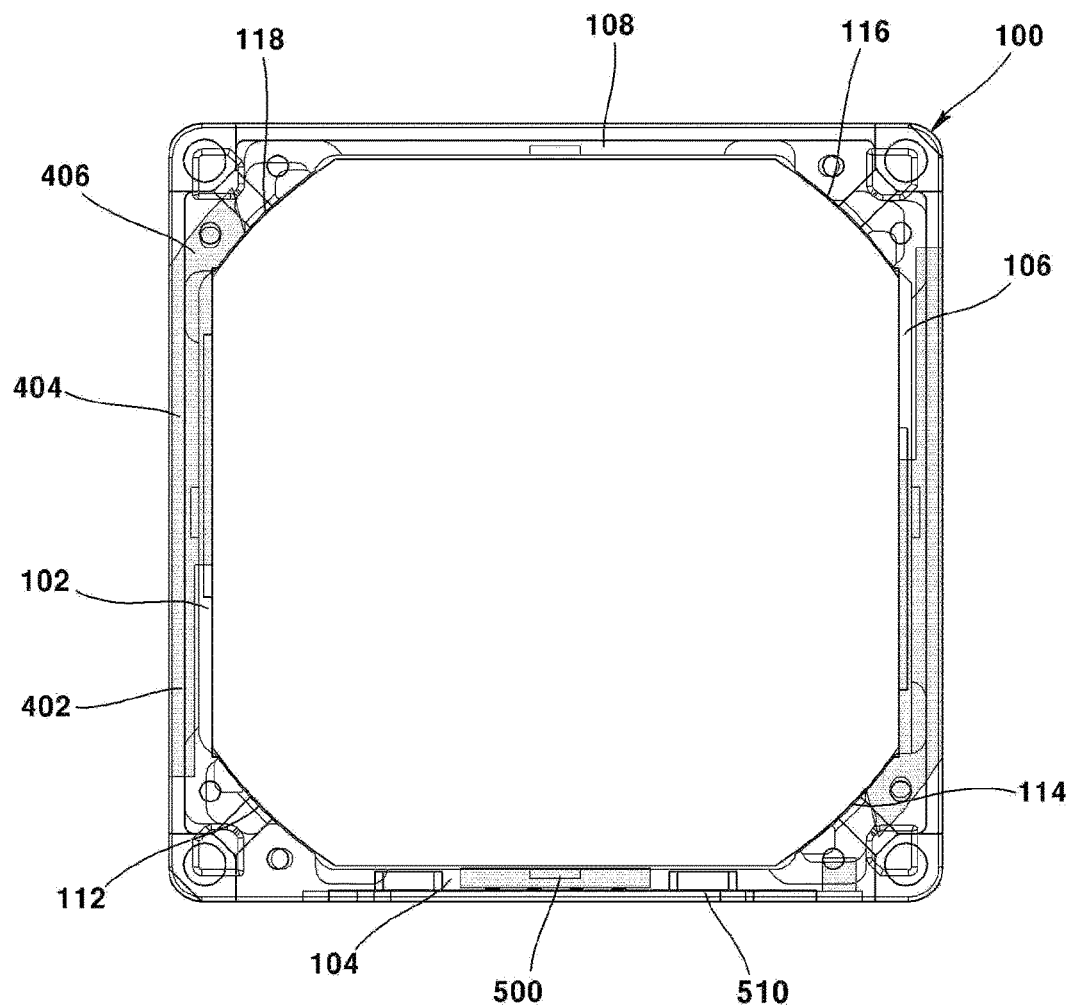
Figure 6:
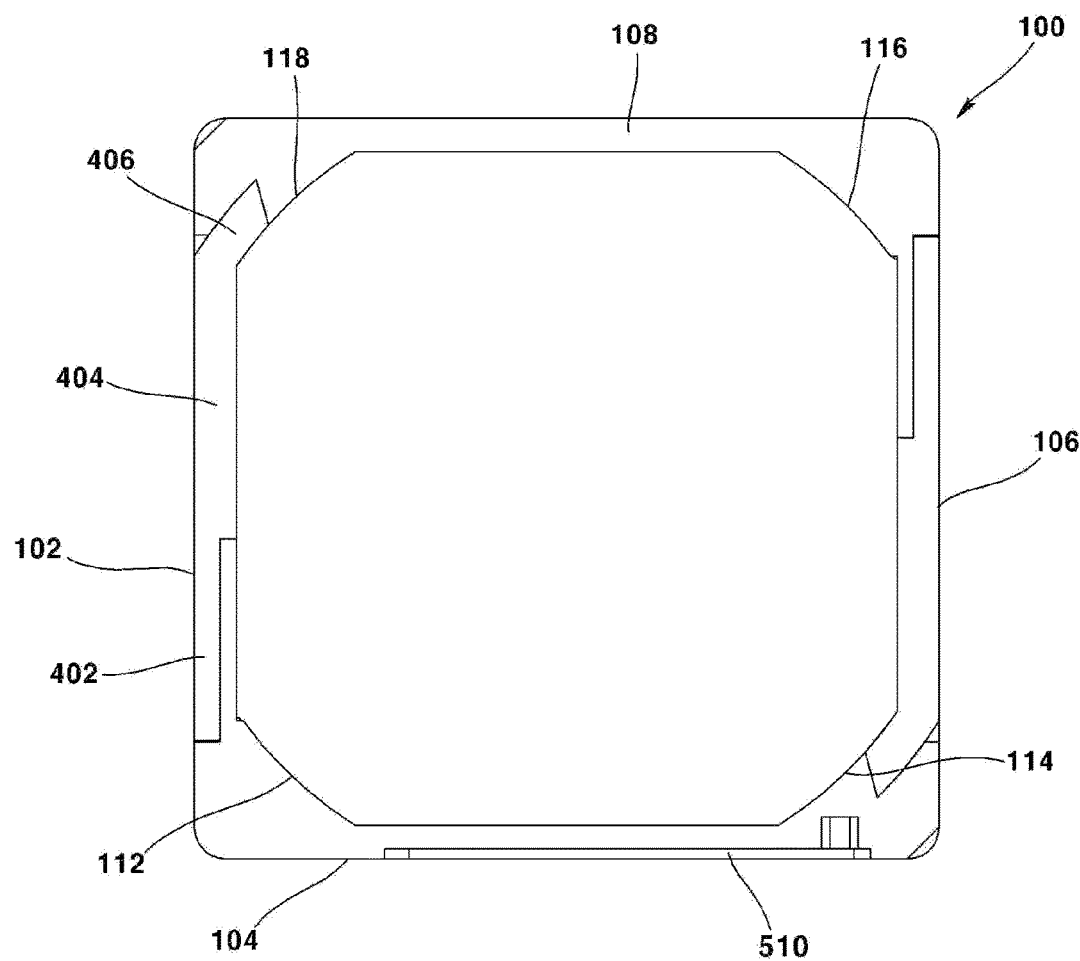
FIG. 6 is a cross-sectional view of a partial configuration of a camera module according to an embodiment of the present invention.
Figure 7:
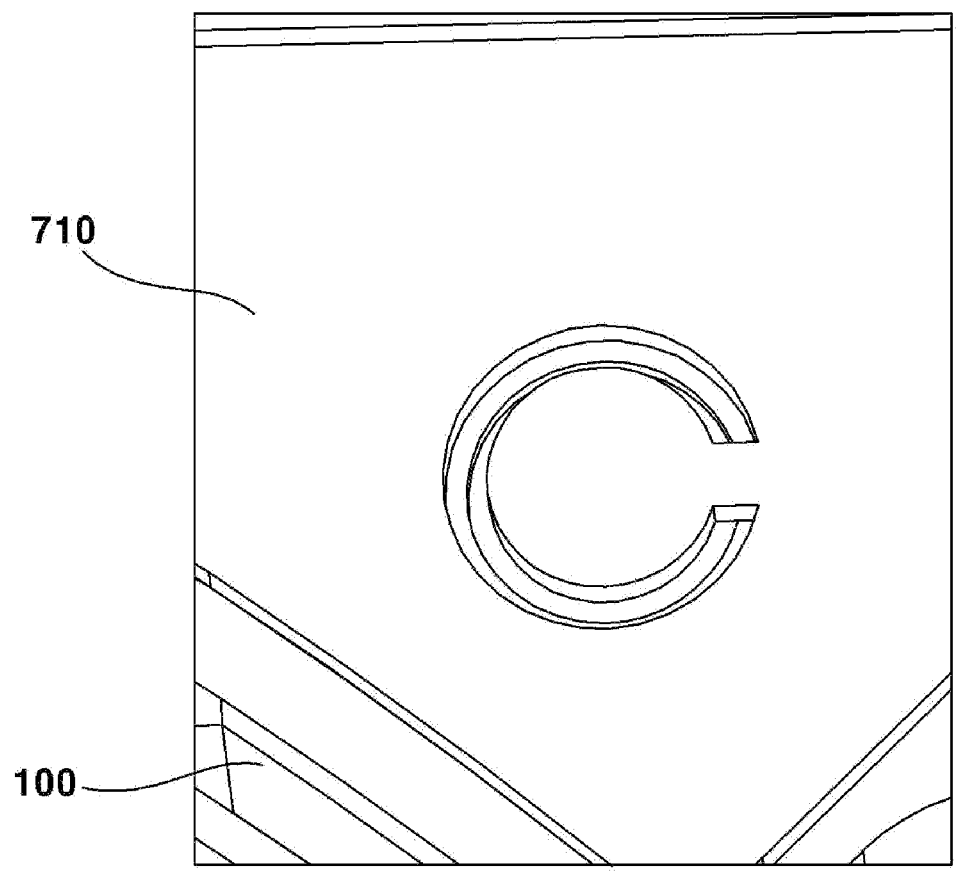
FIGS. 7 to 9 are perspective views of partial configurations of a camera module according to an embodiment of the present invention.
Figure 8:
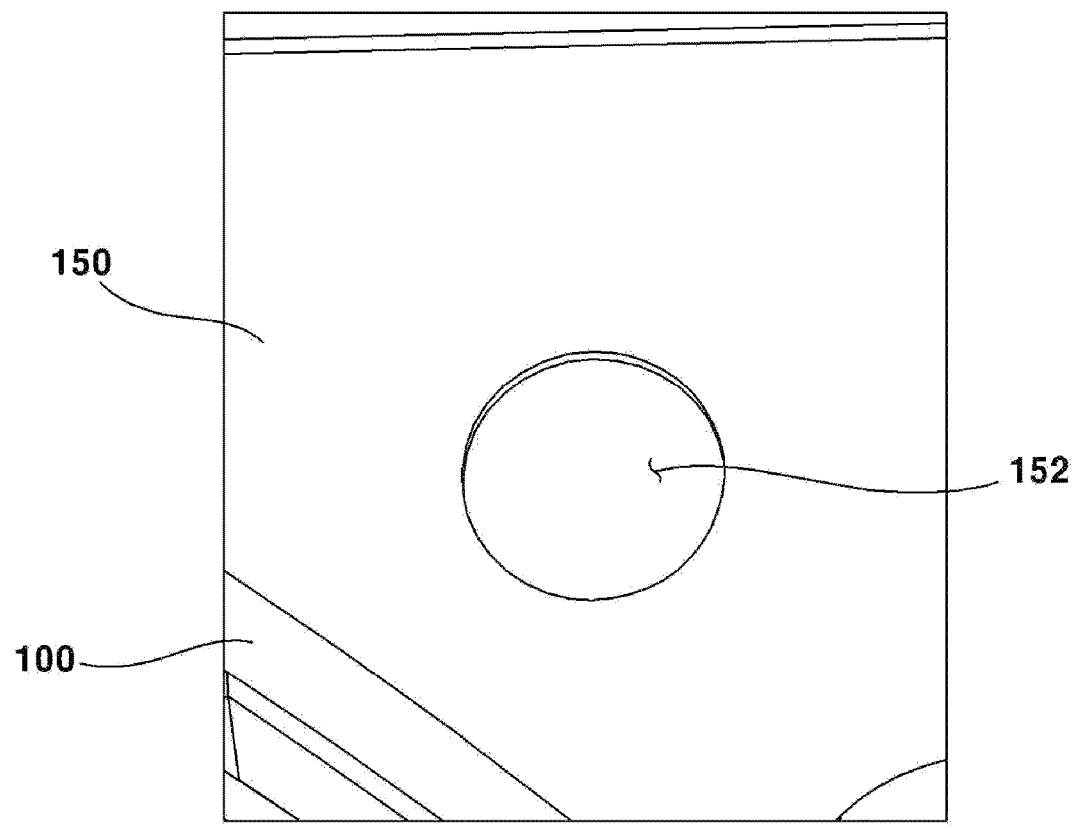
Figure 9:
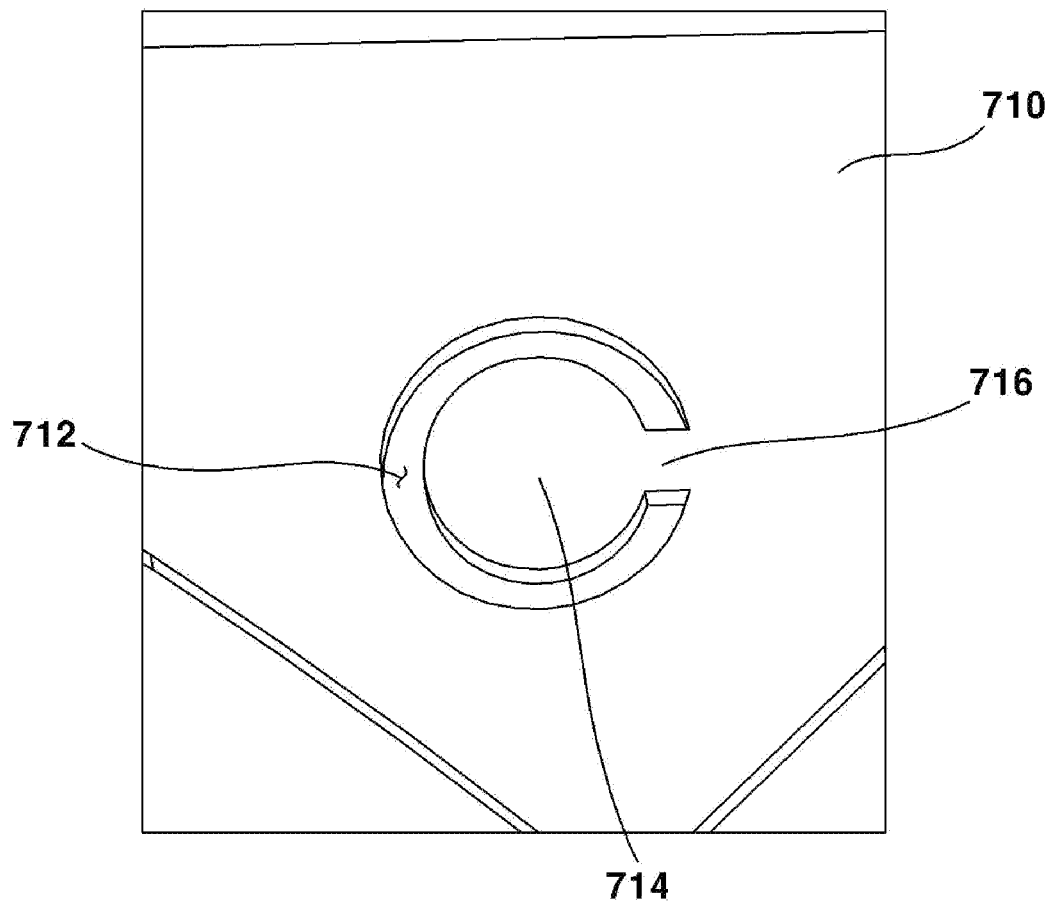

FIG. 1 is a perspective view of a camera module according to an embodiment of the present invention. FIG. 2 is an exploded perspective view of a camera module according to an embodiment of the present invention. FIG. 3 is a perspective view of a partial configuration of a camera module according to an embodiment of the present invention. FIGS. 4 and 5 are plan views of partial configurations of a camera module according to an embodiment of the present invention. FIG. 6 is a cross-sectional view of a partial configuration of a camera module according to an embodiment of the present invention. FIGS. 7 to 9 are perspective views of partial configurations of a camera module according to an embodiment of the present invention.

Referring to FIGS. 1 to 7, the camera module 10 according to an embodiment of the present invention may comprise a housing 100, a bobbin 200, a lens module (not shown), a coil 300, and a first magnet 400, a second magnet 430, a sensor 500, elastic members 710 and 720, a base 800, a filter (not shown), a printed circuit board (not shown), a cover can 900, but may be implemented excluding some of the configurations, and additional configurations other than these are not excluded.

The camera module 10 may comprise a lens driving device. A lens driving device according to an embodiment of the present invention comprises a housing 100, a bobbin 200, a coil 300, a first magnet 400, a second magnet 430, a sensor 500, and elastic members 710 and 720 may be comprised, but it may be implemented excluding some of the configurations, and additional configurations other than these are not excluded. In an embodiment of the present invention, the lens driving device performs an autofocus function as an example, but may also perform a hand shake correction function. The lens driving device may be a voice coil motor (VCM).

The camera module 10 may comprise a housing 100. The housing 100 may be disposed outside the bobbin 200. The housing 100 may accommodate at least a portion of the bobbin 200. The housing 100 may be disposed inside the cover can 900. The housing 100 may be disposed between the cover can 900 and the bobbin 200. The housing 100 may be formed of a material different from that of the cover can 900. The housing 100 may be formed of an insulating material. The housing 100 may be formed of an injection product. The outer lateral surface of the housing 100 may be spaced apart from the inner surface of the side plate of the cover can 900. The housing 100 may move for OIS driving through the spaced space between the housing 100 and the cover can 900. A first magnet 400 may be disposed in the housing 100. The housing 100 and the first magnet 400 may be coupled to each other by an adhesive. An upper elastic member 710 may be coupled to an upper surface of the housing 100. A lower elastic member 720 may be coupled to the lower surface of the housing 100. The housing 100 may be coupled to the elastic members 710 and 720 by thermal fusion and/or an adhesive. The adhesive coupling the housing 100 and the first magnet 400, and the housing 100 and the elastic members 710 and 720 may be an epoxy cured by at least one of ultraviolet (UV), heat, and laser.

The housing 100 may comprise first to fourth lateral surfaces 102, 104, 106, and 108. The housing 100 may comprise first to fourth surfaces 112, 114, 116, and 118 disposed between the first to fourth lateral surfaces 102, 104, 106, and 108, respectively. The first to fourth surfaces 112, 114, 116, and 118 may be first to fourth corner portions of the housing 100. The first to fourth lateral surfaces 102, 104, 106, and 108 of the housing 100 may face the fifth to eighth lateral surfaces 202, 204, 206, and 208 of the bobbin 200. The first to fourth surfaces 112, 114, 116, and 118 of the housing 100 may face the fifth to seventh surfaces of the bobbin 200.

The housing 100 may comprise a through hole. The through hole may be formed to penetrate the housing 100 in the optical axis direction. The bobbin 200 may be disposed in the through hole. The through hole may be formed in a shape corresponding to the bobbin 200 at least in portion. The inner circumferential surface of the housing 100 forming the through hole may be spaced apart from the outer circumferential surface of the bobbin 200. However, the housing 100 and the bobbin 200 may be overlapped with at least in portion in the optical axis direction to limit the moving stroke distance of the bobbin 200 in the optical axis direction.

The housing 100 may comprise first magnet coupling portions 130 and 132. The first magnet 400 may be coupled to the first magnet coupling portions 130 and 132. The first magnet coupling portions 130 and 132 may comprise: a groove 130 formed concave inward from the outer lateral surface of the housing 100; a hole 132 formed in at least some regions of the groove 130; and an extension portion extending from the groove 130 to the corner of the housing 100. The first magnet coupling portions 130 and 132 may comprise two first magnet coupling portions. The two first magnet coupling portions may be symmetrically formed with respect to the optical axis.

The housing 100 may comprise a substrate coupling portion 140. The substrate coupling portion 140 may comprise a groove formed concave in the outer lateral surface of the housing 100. A substrate 510 may be disposed on the substrate coupling portion 140.

The housing 100 may comprise a sensor coupling portion 142. The sensor coupling portion 142 may comprise a hole formed on an inner lateral surface of the housing 100. A sensor 500 may be disposed on the sensor coupling portion 142.

The housing 100 may comprise a first portion being extended from an inner surface. The housing 100 may comprise a first portion disposed between the coil 300 and the second region 402 of the first magnet 400 in a direction perpendicular to the optical axis. The second region 402 of the first magnet 400 may be disposed in contact with the first portion of the housing 100. The sum of the second thickness of the second region 402 of the first magnet 400 and the thickness of the first portion of the housing 100 may be equal to the first thickness of the first region 404 of the first magnet 400.

The housing 100 may comprise a second portion being extended from an outer surface. A third region 406 of the first magnet 400 may be disposed between the second portion of the housing 100 and the bobbin 200 in a direction perpendicular to the optical axis.

The camera module 10 may comprise a bobbin 200. The bobbin 200 may be disposed in the housing 100. The bobbin 200 may be disposed inside the housing 100. The bobbin 200 may be disposed in a through hole being extended in the vertical direction of the housing 100. The bobbin 200 may be movably coupled to the housing 100. The bobbin 200 may move in the optical axis direction with respect to the housing 100. A lens module may be coupled to the bobbin 200. The bobbin 200 and the lens module may be coupled by screw-coupling and/or an adhesive. The coil 300 may be coupled to the bobbin 200. An upper elastic member 710 may be coupled to an upper surface of the bobbin 200. The lower elastic member 720 may be coupled to a lower surface of the bobbin 200. The bobbin 200 may be coupled to the elastic members 710 and 720 by thermal fusion and/or an adhesive. The adhesive that couples the bobbin 200 and the lens module and the bobbin 200 and the elastic members 710 and 720 may be an epoxy being cured by at least one of ultraviolet (UV), heat, and laser.

The bobbin 200 may comprise fifth to eighth lateral surfaces 202, 204, 206, and 208. The bobbin 200 may comprise fifth to eighth surfaces disposed between the fifth to eighth lateral surfaces 202, 204, 206, and 208, respectively. The fifth to eighth surfaces may be fifth to eighth corner portions of the bobbin 200. The fifth to eighth lateral surfaces 202, 204, 206, and 208 may face the first to fourth lateral surfaces 102, 104, 106, and 108 of the housing 100, respectively. The fifth to eighth surfaces of the bobbin 200 may face the first to fourth surfaces 112, 114, 116, and 118 of the housing 100, respectively.

The bobbin 200 may comprise a through hole. The through hole may penetrate the bobbin 200 in the optical axis direction. A lens module may be accommodated in the through hole. For example, a thread corresponding to a thread formed on the outer circumferential surface of the lens module may be disposed on the inner circumferential surface of the bobbin 200 forming the through hole.

The bobbin 200 may have a coil coupling portion 220 disposed thereon. The coil 300 may be disposed in the coil coupling portion 220. The coil coupling portion 220 may comprise a groove formed by recessing a portion of the outer lateral surface of the bobbin 200. In this case, the coil 300 may be accommodated in the groove of the coil coupling portion 220.

The bobbin 200 may comprise a coil support portion 210. The coil support portion 210 may be disposed in a lower region of or below the coupling portion 220. The coil support portion 210 may support at least a portion of the coil 300.

The bobbin 200 may comprise a second magnet coupling portion 230. The second magnet coupling portion 230 may be a groove formed inwardly from the coil coupling portion 220 of the bobbin 200. The second magnets 430 and 440 may be disposed in the second magnet coupling portion 230.

The camera module 10 may comprise a lens module. The lens module may comprise at least one lens. The lens module may comprise a lens and a barrel. The lens module may be coupled to the bobbin 200. The lens module may be disposed in a through hole being extended in a vertical direction of the bobbin 200. The lens module may be coupled to the bobbin 200 by screw-coupling and/or an adhesive. The lens module can move integrally with the bobbin 200.

The camera module 10 may comprise a coil 300. The coil 300 may be disposed on the bobbin 200. The coil 300 may be disposed between the bobbin 200 and the housing 100. The coil 300 may be disposed on the outer circumferential surface of the bobbin 200. The coil 300 may be disposed on the outer circumferential surface of the bobbin 200. The coil 300 may be disposed on the coil coupling portion 220 of the bobbin 200. The coil 300 may be supported by the coil support portion 210 of the bobbin 200. The coil 300 may be directly wound on the bobbin 200. Alternatively, the coil 300 may be coupled to the bobbin 200 while being directly wound. The coil 300 may face the first magnet 400. The coil 300 may electromagnetically interact with the first magnet 400. In this case, when current is supplied to the coil 300 and an electromagnetic field is formed around the coil 300, the coil 300 may move with respect to the first magnet 400 due to an electromagnetic interaction between the coil 300 and the first magnet 400. The coil 300 may be a single coil formed integrally.

The camera module 10 may comprise a first magnet 400. The first magnet 400 may be disposed in the housing 100. The first magnet 400 may be fixed to the housing 100 by an adhesive. The first magnet 400 may be disposed between the bobbin 200 and the housing 100. The first magnet 400 may face the coil 300. The first magnet 400 may electromagnetically interact with the coil 300. The first magnet 400 may be used for AF driving. The first magnet 400 may be a driving magnet. The first magnet 400 may be disposed at a side portion and a corner portion of the housing 100. The first magnet 400 may be disposed on the first magnet coupling portions 130 and 132 of the housing 100. The first magnet 400 may have a first width and a second width that is narrower than the second width. At this time, the width may be a thickness in a direction perpendicular to the optical axis.

The first magnet 400 may comprise a first region 404. The first region 404 may be disposed between the second region 402 and the third region 406. The first region 404 may have a first width. The first width may be larger than the second width. The length of the first region 404 may be longer than the length of the second region 402. The length of the inner surface of the first region 404 in the horizontal direction may be longer than the length of the inner surface of the second region 402 in the horizontal direction. The first region 404 may be disposed on at least one of the first to fourth lateral surfaces 102, 104, 106, and 108 of the housing 100. That is, the first region 404 of the first magnet 400 may be disposed on a lateral surface of the housing 100. For example, the first region 404 may be disposed on the first lateral surface 102 of the housing 110. The first region 404 may be disposed in the region of the hole 132 of the first magnet coupling portions 130 and 132.

The first magnet 400 may comprise a second region 402. The second region 402 may be extended from one end of the first region 404. The second region 402 may have a second width. The second width may be smaller than the first width. Through this, interference with the second magnets 430 and 440 may be minimized. The length of the second region 402 may be longer than the length of the first region 404. The second region 402 may be disposed on at least one of the first to fourth lateral surfaces 102, 104, 106, and 108 of the housing 100. That is, the second region 402 of the first magnet 400 may be disposed on a lateral surface of the housing 100. For example, the second region 402 may be disposed on the first lateral surface 102 of the housing 110. The second region 402 may be disposed in the region of the groove 130 of the first magnet coupling portions 130 and 132. The second region 402 may be overlapped with the first and/or second surfaces 112 and 114 in a direction perpendicular to the optical axis. The second region 402 of the first magnet 400 may be formed by a groove or a recess formed on the inner surface of the first magnet 400. Accordingly, a thickness of the second region 402 in a direction perpendicular to the optical axis may be thinner than a thickness of the first region 404 in a direction perpendicular to the optical axis.

The first magnet 400 may comprise a third region 406. The third region 406 may be formed to be extended from the other end of the first region 404. The third region 406 may be bent from the other end of the first region 404. The third region 406 may be disposed on at least one of the first to fourth surfaces 112, 114, 116, and 118 of the housing 100. That is, the third region 406 of the first magnet 400 may be disposed at a corner of the housing 100. For example, the third region 406 may be disposed on the fourth surface 118 of the housing 100. The third region 406 may be disposed at an extension portion of the first magnet coupling portions 130 and 132. Through this, the electromagnetic force interacting between the first magnet 400 and the coil 300 may be enhanced. The third region 406 may be extended from the first region 404. The third region 406 may be extended inclinedly from the first region 404. The third region 406 may be formed to have a curvature. At least a portion of the third region 406 may be formed to be round. The third region 406 may be formed to have the same thickness as the first region 404. The third region 406 may be formed to be curved inward from the end portion of the first region 404.

The first magnet 400 may comprise: a first region 404 having a first thickness between the inner and outer surfaces; a second region 402 extending from one end of the first region 404 and having a second thickness less than the first thickness; and a third region 406 that is bent and extended from the other end of the first region 404. The third region 406 may have a first thickness at least in portion.

The first magnet 400 may comprise: a first region 404 that is not overlapped with the housing 100 in a first direction perpendicular to the optical axis; a second region 402 being extended from one end of the first region 404 and overlapping with the first portion of the housing 100 in a first direction; and a third region 406 being extended from the other end of the first region 404 and being overlapped with the second portion of the housing 100 in the first direction.

The first magnet 400 may comprise two first magnets 410 and 420. The two first magnets 410 and 420 may be symmetrically disposed with respect to the optical axis. One 420 of the two first magnets 410 and 420 is disposed on the first lateral surface 102 of the housing 100, and the other 410 may be disposed on the third lateral surface 106 of the housing 100.

The camera module 10 may comprise second magnets 430 and 440. The second magnets 430 and 440 may be disposed on the bobbin 200. The second magnets 430 and 440 may be referred to as 'sensing magnets' that detect movement of the bobbin 200 in the optical axis direction. The movement of the second magnets 430 and 440 may be detected by the sensor 500 disposed in the housing 100. The second magnets 430 and 440 may be formed on a lateral surface of the bobbin 200. The second magnets 430 and 440 may be disposed on the second magnet coupling portion 230 of the bobbin 200. The second magnets 430 and 440 may be disposed inside the coil 300. The second magnets 430 and 440 may be overlapped with at least a portion of the first magnet 400 in a direction perpendicular to the optical axis.

The second magnets 430 and 440 may comprise two second magnets 430 and 440. One of the two second magnets 430 and 440 may be disposed on the sixth lateral surface 204 of the bobbin 200, and the other may be disposed on the eighth lateral surface 208 of the bobbin 200. The two second magnets 430 and 440 may be formed symmetrically with respect to the optical axis. Each of the two second magnets 430 and 440 may be overlapped with the two first magnets 410 and 420 in a direction perpendicular to the optical axis. Specifically, each of the two second magnets 430 and 440 may be overlapped with the third region 406 of the two first magnets 410 and 420 in a direction perpendicular to the optical axis.

In an embodiment of the present invention, the second magnet 430 and 440 has been described as an example comprising two magnets 430 and 440, but unlike this, the second magnet 430 is formed as one, and the second magnet It may also comprise a compensation magnet 440 formed symmetrically with respect to the 430 and the optical axis. That is, the compensation magnet 440 may be interpreted as corresponding to the other one of the two magnets 430 and 440 described in the embodiment of the present invention. The compensation magnet 440 is disposed to achieve magnetic force equilibrium with the second magnet 430 and may have a size and/or shape corresponding to the second magnet 430. Through this, it is possible to reduce the cost compared to the case of using the two sensing magnets 430 and 440.

The camera module 10 may comprise a second magnet 430 and a third magnet 440. At this time, the second magnet 430 may be a sensing magnet and the third magnet 440 may be a compensation magnet.

The camera module 10 may comprise a sensor 500. The sensor 500 may be disposed in the housing 100. The sensor 500 may be disposed on the sensor coupling portion 142 of the housing 100. The sensor 500 may be electrically connected to the substrate 510. The sensor 500 may be disposed on the substrate 510. The sensor 500 may detect movement of the second magnets 430 and 440. The sensor 500 may comprise a Hall sensor. At this time, the sensor 500 may sense the magnetic force of the second magnets 430 and 440 to detect the movement of the bobbin 200. The detection value sensed by the sensor 500 may be used for AF feedback control.

The camera module 10 may comprise a substrate 510. The substrate 510 may be disposed in the housing 100. The substrate 510 may be disposed on the substrate coupling portion 140 of the housing 100. The substrate 510 may be electrically connected to the sensor 500. At least a portion of the substrate 510 may be extended downward to be connected to the base 800. The substrate 510 may be electrically connected to the base 800. The substrate 510 may be electrically connected to the printed circuit board of the base 800. The substrate 510 may comprise a printed circuit board. The substrate 510 may comprise a flexible printed circuit board (FPCB).

The camera module 10 may comprise elastic members 710 and 720. The elastic members 710 and 720 may elastically support the bobbin 200. The elastic members 710 and 720 may movably support the bobbin 200. The elastic members 710 and 720 may have elasticity at least in portion. The elastic members 710 and 720 may be formed of a material having elasticity. The elastic members 710 and 720 may support movement of the bobbin 200 during AF driving. At this time, the elastic members 710 and 720 may be referred to as 'AF support members'.

The elastic members 710 and 720 may comprise an upper elastic member 710 and a lower elastic member 720.

The upper elastic member 710 may be connected to the housing 100 and the bobbin 200. One side of the upper elastic member 710 may be coupled to an upper portion of the bobbin 200, and the other side of the upper elastic member 710 may be coupled to an upper portion of the housing 100. The upper elastic member 710 may be formed of a plate spring. The upper elastic member 710 may comprise: an inner elastic portion coupled to the upper surface of the bobbin 200; an outer elastic portion coupled to the upper surface of the housing 100; and a connection elastic portion connecting the inner elastic portion and the outer elastic portion.

The lower elastic member 720 may be connected to the bobbin 200 and the base 800. One side of the lower elastic member 720 may be coupled to a lower portion of the bobbin 200, and the other side of the lower elastic member 720 may be coupled to an upper portion of the base 800. The lower elastic member 720 may be formed of a plate spring. The lower elastic member 720 may comprise: an inner elastic portion coupled to the lower surface of the bobbin 200; an outer elastic portion coupled to the upper surface of the base 800; a connection elastic portion connecting the inner elastic portion and the outer elastic portion.

The elastic members 710 and 720 may comprise: a body; a hole 712 formed in the body; an extension portion 714 disposed in the hole 712; and a connection portion 716 connecting the extension portion 714 and the body. The extension portion 714 may be overlapped with the groove 152 formed in the upper surface 150 of the housing 100 in the optical axis direction. The hole 712 may be formed in the shape of a letter "C". Alternatively, the hole 712 may be formed in a square shape with a portion cut off or in the shape of a letter "⊥". The extension portion 714 may be formed in a circular shape. Alternatively, the extension portion 714 may be formed in a triangular or square shape. Through this, the adhesive is applied to the groove 152 of the housing 100 and the extension portion 714 is pressed down, so that the extension portion 714 can be fixed to the upper surface 150 of the housing 100 through the adhesive. That is, despite the height difference between the parent body of the elastic members 710 and 720 and the upper surface 150 of the housing 100, bonding can be performed efficiently. An adhesive may be disposed in the groove 152 of the housing 100. An adhesive may be disposed in the holes 712 of the elastic members 710 and 720. The extension portion 714 of the elastic members 710 and 720 may be adhered to the housing 100 by the adhesive. The adhesive may connect the extension portion 714 of the elastic members 710 and 720 to the housing 100.

In one embodiment of the present invention, although it is described as an example that the hole 712, the extension portion 714, and the connection portion 716 are formed on an outer elastic portion of the upper elastic member 710, and the groove 152 is formed on the upper surface 150 of the housing 100, unlike to this, the hole 712, the extension portion 714, and the connection portion 716 may be formed in an inner elastic portion or a lower elastic member 720 of the upper elastic member 710, and the groove 152 may be formed on an upper or a lower surface of the bobbin 200 or on an upper surface of the base 800. That is, it may be applied to at least one portion where the elastic members 710 and 720 and the housing 100, the bobbin 200, and/or the base 800 are coupled. A hole 712 and an extension portion 714 may be formed in an inner elastic portion of the upper elastic member 710. At this time, a groove 152 may be formed at a corresponding position on an upper surface of the bobbin 200. The outer elastic portion of the lower elastic member 720 may comprise a hole 712 and an extension portion 714. At this time, a groove 152 may be formed at a position corresponding to the lower surface of the housing 100. The inner elastic portion of the lower elastic member 720 may comprise a hole 712 and an extension portion 714. At this time, a groove 152 may be formed at a position corresponding to the lower surface of the bobbin 200.

The camera module 10 may comprise a base 800. The base 800 may be disposed under the housing 100. The base 800 may be combined with the cover can 900. A printed circuit board may be disposed on the base 800.

The base 800 may comprise a through hole formed in the central region. The through hole may be formed to penetrate the base 800 in the optical axis direction. Light passing through the lens module through the through hole may be incident on the image sensor.

The camera module 10 may comprise a filter. The filter may comprise an infrared filter. The infrared filter may block light from an infrared region from entering the image sensor. The infrared filter may be disposed between the lens module and the image sensor. For example, the infrared filter may be disposed on a sensor base (not shown) disposed between the lens driving device and the printed circuit board. As another example, an infrared filter may be disposed on the base 800.

The camera module 10 may comprise a printed circuit board. The printed circuit board may be disposed on the base 800. Unlike this, the printed circuit board may be disposed below the sensor base. The printed circuit board may be electrically connected to the lens driving device. An image sensor may be disposed on the printed circuit board. The printed circuit board may be electrically connected to the image sensor.

The camera module 10 may comprise an image sensor. The image sensor may be disposed on a printed circuit board. The image sensor may be electrically connected to the printed circuit board. For example, the image sensor may be coupled to a printed circuit board by a surface mounting technology (SMT). As another example, the image sensor may be coupled to a printed circuit board by a flip chip technology. The image sensor may be disposed so that the lens and the optical axis coincide. That is, the optical axis of the image sensor and the optical axis of the lens may be aligned. The image sensor may convert light irradiated to the effective image region of the image sensor into an electrical signal. The image sensor may be any one of a charge coupled device (CCD), a metal oxide semi-conductor (MOS), a CPD, and a CID.

The camera module 10 may comprise a control unit. The control unit may be disposed on a printed circuit board. The control unit may individually control the direction, intensity, and amplitude of the current supplied to the coil 300. The control unit may perform an auto focus function by controlling the lens driving device. Furthermore, the control unit may perform auto focus feedback control on the lens driving device.

The camera module 10 may comprise a cover can 900. The cover can 900 may be coupled to the base 800. The cover can 900 may accommodate the housing 100 therein. The cover can 900 may form the outer appearance of the camera module 10. The cover can 900 may have a hexahedral shape with an open bottom surface. The cover can 900 may be a non-magnetic material. The cover can 900 may be formed of a metal material. The cover can 900 may be formed of a metal plate. The cover can 900 may be connected to the ground portion of the printed circuit board. Through this, the cover can 900 may be grounded. The cover can 900 may block electromagnetic interference (EMI). At this time, the cover can 900 may be referred to as 'EMI shield can'.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A lens driving device comprising:
a housing;
a bobbin disposed in the housing;
a coil disposed on the bobbin;
a first magnet disposed on the housing and facing the coil;
a second magnet disposed on the bobbin; and
a sensor configured to sense the second magnet,
wherein the first magnet comprises an inner surface facing the coil, and an outer surface disposed opposite the inner surface,
wherein the first magnet comprises a first region having a first thickness between the inner surface and the outer surface, a second region extending from the first region and having a second thickness smaller than the first thickness, and a third region bent and extending from the first region,
wherein the second magnet is overlapped with the third region of the first magnet in a first direction perpendicular to an optical axis, and
wherein the first direction is perpendicular to the inner surface of the first region of the first magnet.

2. The lens driving device of claim 1, wherein the housing comprises a first portion disposed between the coil and the second region of the first magnet in the first direction.

3. The lens driving device of claim 2, wherein the second region of the first magnet is disposed in contact with the first portion of the housing, and
wherein a sum of the second thickness of the second region of the first magnet and a thickness of the first portion of the housing is same as the first thickness of the first region of the first magnet.

4. The lens driving device of claim 1, wherein the second region of the first magnet extends from a first end of the first region, and
wherein the third region of the first magnet extends from a second end of the first region.

5. The lens driving device of claim 4, wherein the housing comprises first to fourth lateral portions and first to fourth corner portions formed between the first to fourth lateral portions, and
wherein the first and second regions of the first magnet are disposed on the first lateral portion of the housing, and the third region is disposed on the fourth corner portion of the housing.

6. The lens driving device of claim 1, wherein a length of an inner surface of the first region in a horizontal direction is greater than a length of an inner surface of the second region in the horizontal direction.

7. The lens driving device of claim 1, wherein the first magnet comprises two first magnets, and
wherein the two first magnets are symmetrical to each other with respect to the optical axis.

8. The lens driving device of claim 4, wherein the housing comprises a second portion, and
wherein the third region of the first magnet is disposed between the second portion of the housing and the bobbin in a direction perpendicular to the optical axis.

9. The lens driving device of claim 1, comprising an elastic member connecting the bobbin and the housing,
- wherein the housing comprises a groove formed on an upper surface of the housing,
- wherein the elastic member comprises a body, a hole formed in the body, an extension portion disposed on the hole, and a connection portion connecting the extension portion and the body,
- wherein the extension portion is overlapped with the groove of the housing in an optical axis direction, and
- wherein an adhesive bonding the extension portion of the elastic member to the housing is disposed in the groove of the housing.

10. The lens driving device of claim 5, wherein the bobbin comprises first to fourth lateral surfaces facing the first to fourth lateral portions of the housing, respectively, and
- wherein the second magnet is disposed on the second lateral surface of the bobbin.

11. The lens driving device of claim 1, comprising a cover covering the housing and comprising an upper plate and a plurality of lateral plates extending from the upper plate,
- wherein the plurality of lateral plates comprises first and second lateral plates opposite to each other and third and fourth lateral plates opposite to each other,
- wherein the first magnet comprises a first magnet unit disposed between the bobbin and the first lateral plate of the cover, and a second magnet unit disposed between the bobbin and the second lateral plate of the cover, and
- wherein the second magnet is overlapped with the first magnet unit in the first direction.

12. The lens driving device of claim 11, comprising a compensation magnet disposed on the bobbin at a position opposite to that of the second magnet,
- wherein the compensation magnet is overlapped with the second magnet unit in the first direction.

13. The lens driving device of claim 11, wherein the second magnet is not overlapped with the second magnet unit in the first direction.

14. A camera module comprising:
- a printed circuit board;
- an image sensor disposed on the printed circuit board;
- the lens driving device of claim 11 disposed above the printed circuit board; and
- a lens coupled to the bobbin of the lens driving device.

15. An optical apparatus comprising:
- a main body;
- the camera module of claim 14 disposed on the main body; and
- a display unit disposed on the main body and outputting an image photographed by the camera module.

* * * * *